United States Patent
Volk (10) Patent No.: US 6,606,705 B1
(45) Date of Patent: Aug. 12, 2003

(54) METHOD AND APPARATUS FOR CONFIGURING AN I/O BUFFER HAVING AN INITIALIZED DEFAULT SIGNALING LEVEL TO OPERATE AT A SAMPLED EXTERNAL CIRCUIT SIGNALING LEVEL

(75) Inventor: Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/396,992

(22) Filed: Sep. 15, 1999

(51) Int. Cl.[7] .............. G06F 1/24; G06F 9/00; G06F 3/05
(52) U.S. Cl. ............... 713/100; 713/300; 713/330; 710/52; 710/310
(58) Field of Search ................ 713/100, 300, 713/330; 326/62; 365/26; 710/57, 310

(56) References Cited

U.S. PATENT DOCUMENTS

| | | | |
|---|---|---|---|
| 4,768,170 A | | 8/1988 | Hoff |
| 4,975,598 A | | 12/1990 | Borkar |
| 5,194,765 A | | 3/1993 | Dunlop et al. |
| 5,341,045 A | * | 8/1994 | Almulla ................ 326/62 |
| 5,463,520 A | * | 10/1995 | Nelson ................. 361/56 |
| 5,514,951 A | * | 5/1996 | Halim et al. .......... 328/281 |
| 5,528,166 A | | 6/1996 | Ilkbahar |
| 5,534,801 A | * | 7/1996 | Wu et al. ............. 327/72 |
| 5,578,971 A | | 11/1996 | Minami et al. |
| 5,596,285 A | | 1/1997 | Marbot et al. |
| 5,666,078 A | | 9/1997 | Lamphier et al. |
| 5,798,971 A | | 8/1998 | Larsen et al. |
| 5,898,321 A | | 4/1999 | Ilkbahar et al. |
| 5,930,271 A | * | 7/1999 | Takahashi ............ 371/27.1 |
| 6,023,174 A | * | 2/2000 | Kirsch ................. 326/31 |
| 6,040,714 A | | 3/2000 | Klein |
| 6,040,845 A | * | 3/2000 | Melo et al. ........... 713/320 |
| 6,052,325 A | * | 4/2000 | Merritt ................ 365/189.07 |
| 6,054,881 A | | 4/2000 | Stoenner |
| 6,072,351 A | * | 6/2000 | Sharpe-Geisler ...... 327/112 |
| 6,114,895 A | | 9/2000 | Stephens |
| 6,141,258 A | | 10/2000 | Kawasumi |
| 6,166,563 A | | 12/2000 | Volk et al. |
| 6,272,644 B1 | * | 8/2001 | Urade et al. ......... 713/320 |
| 6,308,289 B1 | * | 10/2001 | Ahrens et al. ........ 714/48 |
| 6,326,821 B1 | | 12/2001 | Gabara |

FOREIGN PATENT DOCUMENTS

| | | | |
|---|---|---|---|
| EP | 0611053 A2 | 8/1994 | |
| EP | 0752677 A3 | 4/1999 | |
| JP | 05013696 A | * 1/1993 | ......... H01L/27/088 |
| WO | WO 98/31017 A1 | 7/1998 | |

OTHER PUBLICATIONS

Rajasekhar Velamuri, Paul Landsberg, and Charles Zukowski, A Multi-Queue Flexible Buffer Manager Architecture, Nov. 29–Dec. 2, 1993, IEEE Global Telecommunications Conference, pp.: 1401–1405 vol. 3.*

Paul Gray and Robert Meyer, "Analysis and Design of Analog Integrated Circuits", 3rd edition, Copyright 1993, John Wile & Sons, pp 201–204.*

(List continued on next page.)

Primary Examiner—Thomas Lee
Assistant Examiner—James Trujillo
(74) Attorney, Agent, or Firm—Peter Lam (57) ABSTRACT

A method for automatically detecting signal levels for buffer configuration. The method of one embodiment first samples a first signal. The first signal is compared with a second signal to determine whether the first signal has a higher voltage potential than the second signal. The result of the comparison is latched. The result of the comparison is used to program buffer characteristics.

41 Claims, 4 Drawing Sheets

OTHER PUBLICATIONS

Thaddeus J. Gabara and Scott C. Knauer, "Digitally Adjustable Resistors in CMOS for High–Performance Applications," IEEE Journal of Solid State Circuits, vol. 27, No. 8, pp. 1176–1185 (Aug. 1992).

Andre DeHon, Thomas Knight, Jr., and Thomas Simon, "Automatic Impedance Control," Proceeding of the 1993 IEEE International Solid–State Circuits Conference, pp. 164–165 (1993).

J. D. Trotter, S. Rekhi, V. Chava, and P C. Kale, "A CMOS Low Voltage High Performance Interface," Proceedings of the $7^{th}$ IEEE International ASIC Conference and Exhibit, pp. 44–48 (Apr. 1994).

Toshiro Takahashi, Makio Uchida, Takahiko Takahashi, Ryozo Yoshino, Masakazu Yamamoto, and Nobuaki Kitamura, "A CMOS Gate Array with 600Mb/s Simulatenous Bidirectional I/O Circuits", Proceedings of 1995 ICCSC, vol. 30, No. 12, pp. 40–41 (1995).

Harold Pilo, Steve Lamphier, Fred Towler, and Richard Hee, "A 300 Mhz, 3.3V 1 Mb SRAM Fabricated in a 0.5um CMOS Process," Proceedings of the 1996 IEEE International Solid–State Circuits Conference, pp. 148–149 (1996).

Thomas F. Knight, Jr. and Alexander Krymm, "A Self–Terminating Low–Voltage Swing CMOS Output Driver," IEEE Journal of Solid–State Circuits, vol. 23, No. 2, pp. 457–464 (Apr. 1988).

Bibliography of Impedance Compensated Driver Papers Related to AGP–4X Buffer Design, Rev. 0.0 (Mar. 10, 1998).

* cited by examiner

METHOD AND APPARATUS FOR CONFIGURING AN I/O BUFFER HAVING AN INITIALIZED DEFAULT SIGNALING LEVEL TO OPERATE AT A SAMPLED EXTERNAL CIRCUIT SIGNALING LEVEL

FIELD OF THE INVENTION

This invention relates to the field of computers and computer systems. More particularly, the present invention relates to a method and apparatus for automatically detecting signal levels for buffer configuration.

BACKGROUND OF THE INVENTION

In recent years, the price of personal computers (PCs) has rapidly declined. As a result, more and more consumers have been able to take advantage of newer and faster machines. Users in both the business and home markets are now purchasing computers for a variety of uses. Numerous peripheral devices, expansion boards, and add-on cards are also available for system upgrades. One common performance upgrade that consumers, especially in the graphic design and game arena, take advantage of is the graphics card.

As the technology in computer systems improves, there has been a move towards lowering the power consumption of computer systems. One attempt to reduce power consumption entails controlling the clock frequency at which a microprocessor operates and the power dissipation of the microprocessor. Another power saving method is to use software in controlling system power and shutting down system devices that are not needed. One power reduction method involves the use of low power circuit devices or lower voltage components in computers.

Low voltage components allow a computer system to operate with less power with no performance loss. Hence newly designed plug-in and expansion boards generally require lower voltages. However, PCs have been around for several years now. An extremely large amount of hardware including peripheral devices and plug-in cards are still in existence and available in the marketplace. Older generations of hardware technology are often referred to as legacy hardware. Legacy hardware may have special needs such as different board interconnects, memory requirements, and power supply voltages.

In order to build computers using the latest hardware devices and yet still maintain backward compatibility with legacy hardware, designer engineers are developing methods and apparatus to provide support in each system for multiple types of technology. For instance, some graphics cards use different signaling levels. One graphics card may allow signaling at the 3.3 volts level. Another graphics card may provide for 1.5 volts level signaling. Systems designed for only one signaling level would not be able to use cards that support other signaling levels.

Adding to the confusion are signaling methods that allow for multiple signaling levels. One such method is the Accelerated Graphics Port (AGP), where signaling can be done at either 1.5 volts or 3.3 volts. The higher 3.3 volts level allows commodity processes and legacy buffer designs to be used in enabling this signaling standard. The lower 1.5 volts level allows higher data transfer rates, lower power consumption at lower transfer rates for mobile systems, or more complex graphics systems with higher transistor count at the same power level. By going to lower voltages, a designer can add more gates and more features to the chip without adding more power. Power is cost on an add-in card. Power also adds cost for on-board regulators Too much chip power on the graphics controller may necessitate a "fan-sink", which is expensive in terms of the bill-of-materials cost. Systems having AGP devices that bridge the different signaling levels need to operate at both levels. Hence, computer designers need a means to control the interface of AGP devices according to the signaling level required.

Present designs in systems with AGP use an input pin to indicate the signaling level. In AGP, the AGP connector has a "type detect" pin for programming the input/output (I/O) power supply. However, the value on the pin is not required to be at any particular logic level. Hence, in some instances, the pin may be floating at an intermediate potential anywhere between ground and a logic high state. Furthermore, the type detect pin has to be ignored for a certain amount of time during the power-up sequence so that an evaluation can be made at the correct time. The existing scheme requires the use of a dedicated pin for setting the buffer level. This requirement may be another disadvantage in some systems. The industry has continuously worked to decrease both the cost and footprint of computer systems as the size of components and circuit devices shrink. The capability of saving a pin on a component such as a memory controller hub (MCH) may help to reduce costs and design headaches.

SUMMARY OF THE INVENTION

A method for automatically detecting signal levels for buffer configuration is described. The method in one embodiment of the present invention first samples a first signal. The first signal is compared with a second signal to determine whether the first signal has a higher voltage potential than the second signal. The result of the comparison is latched. The result of the comparison is used to program buffer characteristics.

Other features and advantages of the present invention will be apparent from the accompanying drawings and from the detailed description that follows.

BRIEF DESCRIPTION OF THE DRAWINGS

The present invention is illustrated by way of example and not limitations in the figures of the accompanying drawings in which like references indicate similar elements, and in which.

DETAILED DESCRIPTION

A method and apparatus for automatically detecting signal levels for buffer configuration is disclosed. Although the following embodiments are described with reference to Intel processor-based personal computers (PCs) and the Accelerated Graphics Port (AGP), other embodiments are applicable to other types of systems and circuits that use buffers or low voltage components. The same techniques and teachings of these and alternate embodiments can easily be applied to other types of circuits having multiple-signaling levels.

Advancements in processor designs and semiconductor manufacturing technology allow future processors to deliver greater performance and consume less power. In order to extend battery life of mobile computers without widening the performance gap with desktop counterparts, computer manufacturers and designers have also instituted power saving technology. In many of the new computer systems, certain components and devices may function at lower or different voltage levels. For instance, some plug-in boards may operate at 12 volts, 5 volts, 3.3 volts, or even 1.5 volts. By reducing the voltage, power consumption may drop significantly with a relatively minor reduction in speed. In an Accelerated Graphics Port, both the master, usually a graphics controller, and the target, usually system logic or a chipset, may operate at both the 3.3 volts and the 1.5 volts signaling levels. The system needs a way to determine what signaling level should be used in communicating with these devices.

Figure 1:
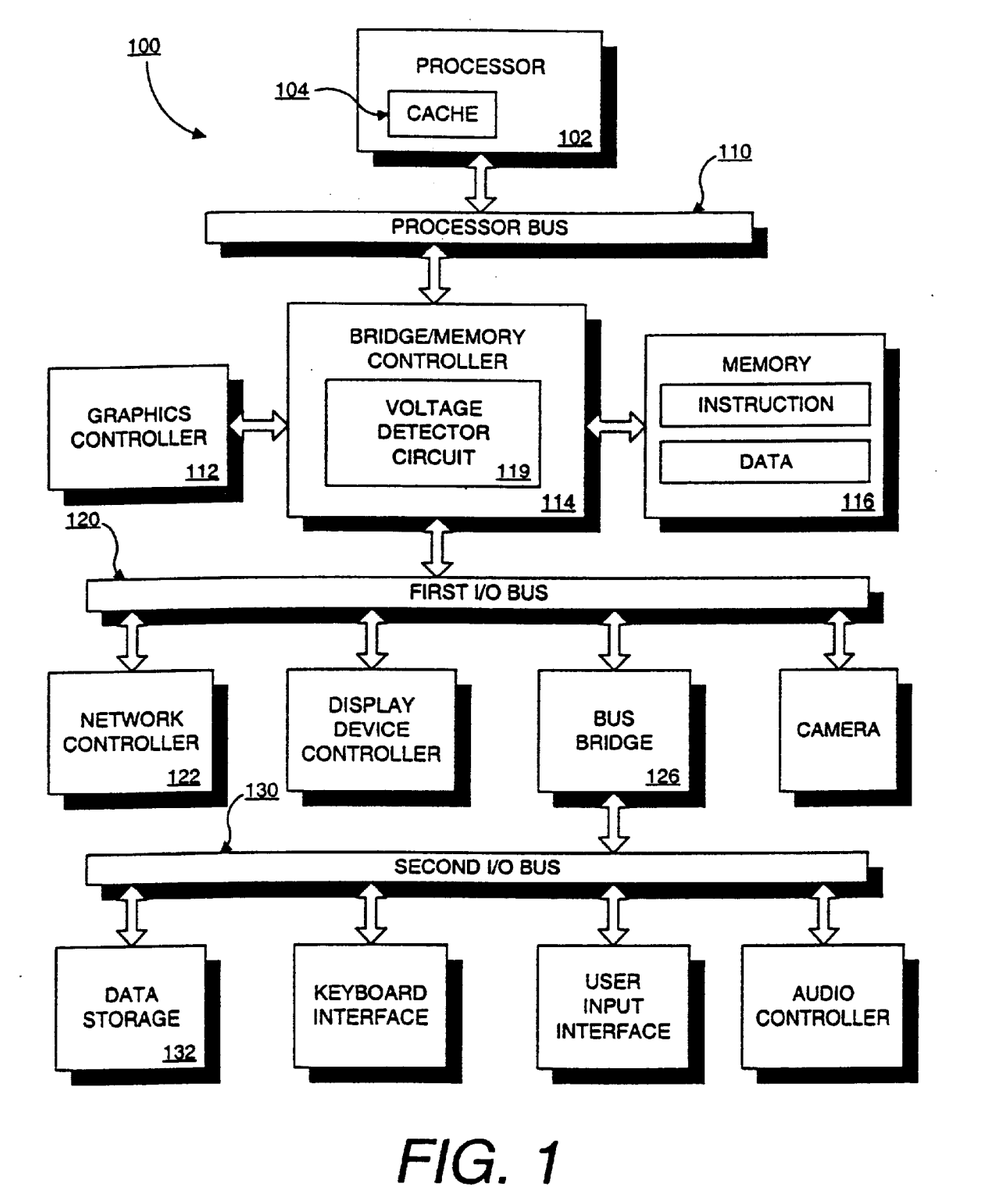
FIG. 1 is a block diagram of a computer system that uses a method of automatically detecting signal levels for buffer configuration.

Referring now to FIG. 1, there is a block diagram illustrating a computer system 100 that may utilize the present invention. Sample system 100 may incorporate bus ratio strap options in chipset logic, in accordance with the present invention, such as in the embodiment described herein. Sample system 100 is representative of processing systems based on the PENTIUM®, PENTIUM® Pro, PENTIUM® II, PENTIUM® III microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

FIG. 1 is a block diagram of a system 100 of one embodiment. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented as a single processor system 100. However, it is understood that embodiments of the present invention may alternatively be implemented as systems having multiple processors. Processor 102 may be coupled to a processor bus 110 that transmits data signals between processor 102 and other components in the system 100. The elements of system 100 perform their conventional functions well known in the art.

System 100 includes a memory 116. Memory 116 may be a dynamic random access memory (DRAM) device, a static random access memory (SRAM) device, or other memory device. Memory 116 may store instructions and/or data represented by data signals that may be executed by processor 102. A cache memory 104 may reside inside processor 102 that stores data signals stored in memory 116. Alternatively, in another embodiment, the cache memory may reside external to the processor.

A bridge/memory controller 114 may be coupled to the processor bus 110 and memory 116. A voltage detector circuit 119 resides in the bridge/memory controller 114. The bridge/memory controller 114 directs data signals between processor 102, memory 116, and other components in the system 100 and bridges the data signals between processor bus 110, memory 116, and a first input/output (I/O) bus 120. In some embodiments, the bridge/memory controller provides a graphics port for coupling to a graphics controller 112. A voltage detector circuit for automatically detecting signal levels for buffer configuration can be located within the bridge/memory controller 114. In one embodiment, the bridge/memory controller 114 may be referred to as the North Bridge portion of the chipset logic.

First I/O bus 120 may comprise a single bus or a combination of multiple buses. First I/O bus 120 provides communication links between components in system 100. The first I/O bus 120 may be a Peripheral Component Interconnect (PCI) local bus. A network controller 122 may be coupled to the first I/O bus 120. A second I/O bus 130 may comprise a single bus or a combination of multiple buses. The second I/O bus 130 provides communication links between components in system 100. The second I/O bus 130 may be an Industry Standard Architecture (ISA) bus. A data storage device 132 may be coupled to second I/O bus 130. The data storage device 132 may comprise a hard disk drive, a floppy disk drive, a CD-ROM device, a flash memory device, or other mass storage device. A bus bridge 126 couples first I/O bus 120 to second I/O bus 130. The bus bridge 126 operates to buffer and bridge data signals between the first I/O bus 120 and the second I/O bus 130. In one embodiment, the bus bridge 126 may be referred to as the South Bridge portion of the chipset logic.

Figure 2:
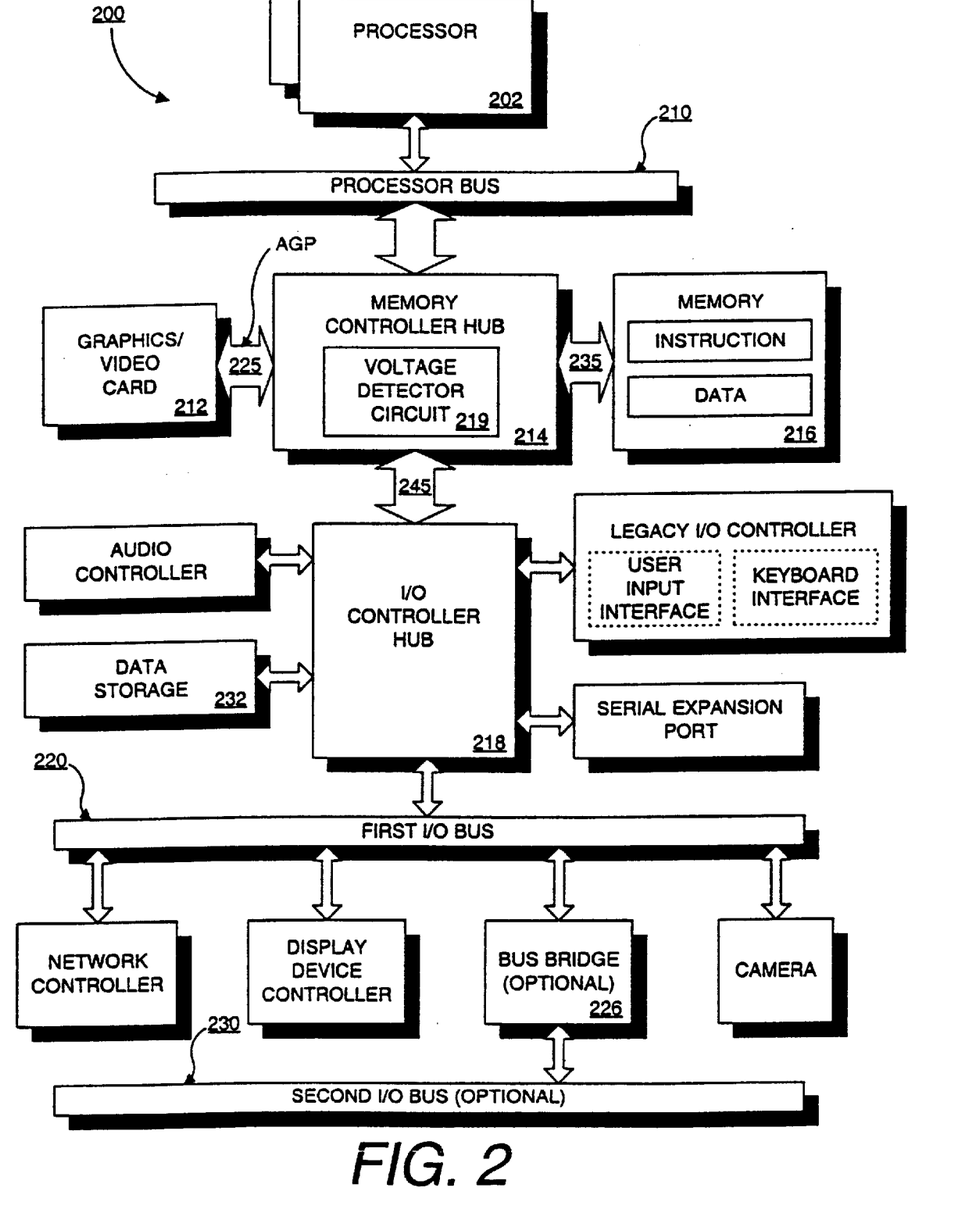
FIG. 2 is a block diagram of one embodiment a system using an Accelerated Graphics Port (AGP) with a memory controller hub (MCH)

FIG. 2 is a block diagram of a system 200 having all the same devices and buses of system 100, but with a slightly different architecture. System 200 is an example of a hub architecture. The processor 202 communicates to a memory controller hub (MCH) 214 via a processor bus 210 in much the same manner as in system 100. The MCH 214 provides a high bandwidth memory path 235 to memory 216 for instruction and data storage and for storage of graphics commands, data and textures. The MCH 214 is also coupled to a graphics controller or video card 212 via an interconnect such as Accelerated Graphics Port (AGP) 225. The purpose of AGP 225 is to create a fast, dedicated interface between the video chipset on the graphics card 212 and the system processor 202. AGP 225 involves only two devices: the processor 202 and the video card 212. In one embodiment, the AGP 225 interface has a type detect pin (TYPEDET#) on the connector for setting the signaling level at either 1.5 volts or 3.3 volts. A voltage detector circuit 219 resides in the MCH 214.

System 200 uses a proprietary hub interface bus 245 to couple the MCH 214 to the I/O controller hub (ICH) 218. The ICH 218 provides direct connections to some I/O devices that were on the first I/O bus 220 or second I/O bus 230 in system 100. Some, examples are the audio controller, data storage 232, legacy I/O controller containing user input and keyboard interfaces, and a serial expansion port such as Universal Serial Bus (USB). The ICH 218 connects to the first I/O bus 220 to allow access to the remaining devices outlined in system 100. The second I/O bus 230 is a system dependent option and requires a bus bridge 226 to connect to the first I/O bus 220.

In another embodiment, the chipset solution may be comprised of a single component that integrates both the North and South Bridge portions of existing chipsets. By using an integrated chipset, mobile PC manufacturers may be able to reduce both component costs and the number of components, ultimately resulting in lower cost mobile PCs and mini-notebook platforms. This integrated solution may have an Accelerated Graphics Port interface for communicating with a graphics controller.

Currently, certain components can function at different signaling levels in the same computer system. This capability is achieved by setting the I/O buffers to the appropriate signaling level depending on the what the connected device requires. Typically, a component is designed for a specific signaling level. In components that support multiple signaling levels, a pin or jumper is set to program the I/O buffers. If the buffers are programmed to an improper setting, the circuits may be damaged.

A methodology to automatically detect signal levels for buffer configuration is described. This enhancement allows computer system designers to build computers that support multiple signaling levels and reap savings on components and board layout. Users can plug different cards such as video controllers into a system without reconfiguring a number of other components on the motherboard each time. In addition, the present invention allows the elimination of a type detect pin. As chip components become smaller and smaller, the available surface area for pins continue to diminish. Design engineers are also searching for low-cost solutions that would reduce the need for pins.

One embodiment is auto configuring. If a buffer was software programmable, a computer virus in the computer system could possibly affect the configuration and cause parts to become damaged. However, the present invention does not use software is to configure the I/O buffers. Hence programming errors or computer viruses would not affect the buffer configurations. Similarly, the present invention removes the need for a register or external pin for programming the I/O interface characteristics. The detector circuit automatically detects and senses the signaling level. Buffers are then configured appropriately. Errors in special wiring or programming that can place the device in an electrical overstress situation may be avoided. Furthermore, the voltage detector circuit of one embodiment provides the chip with a low-cost self-protection mechanism in defaulting buffers to a high signaling level.

One requirement in systems with AGP is that system controllers have to support both the 3.3 volts and 1.5 volts switching or signaling levels. The 3.3 volts capability is generally required for older computer systems and to provide backward compatibility with the PCI local bus. On the other hand, in order to arrive at higher speeds and for scalability of future processors, a 1.5 volts switching convention allows for a higher transfer data rate. However, a problem arises when a designer wants the system controller to universally handle different video cards of either the 3.3 volts standard or the 1.5 volts standard. The power detect and system power-up sequence could destroy circuit components if correct voltages are not properly applied.

In such a situation, the system has to be configured to handle either capability. Existing connectors handle either only the 3.3 volts or the 1.5 volts interface. A more recent connector called the universal connector is capable of handling both voltage levels. If an engineer intends to design a system controller or chipset to be universal in nature, the AGP interconnect permits the system board is configured with a universal connector. A universal connector supports both the 3.3 volts only and the 1.5 volts only card connectors. However, the system with a universal connector still needs to have some way of determining whether a graphics card requires 3.3 volts or 1.5 volts.

In one embodiment of a memory controller hub, multiple power sources are used. The core of the MCH is supplied by a 1.8 volts power supply. An external VCC supply may be used. There is also an I/O power supply called "VDDQ" for generating the I/O signaling levels for AGP. The I/O signaling level VDDQ may be set at either 1.5 volts or 3.3 volts by the system board. AGP interconnects have a pin called "TYPEDET". The TYPEDET pin on a universal AGP connector informs the system board informs the system during power-up what voltage level should be sent to the attached device.

One scheme for determining the signaling level is to use the type detect pin of the AGP interface. A system can poll the TYPEDET pin and determine what kind of power should be applied to a card without damaging the card. Based on the value on the TYPEDET pin, the system can set a programmable power supply to a proper voltage level so that the card is powered up at a correct state. Hence, a 1.5 volts card would receive 1.5 volts and not be damaged by getting 3.3 volts. If the pin is grounded, then the system assumes that the card is a 1.5 volts type card. On the other hand, if the pin is not grounded, the system assumes that the card is a 3.3 volts type card.

But when the pin is ungrounded, the potential on the pin may not be at a recognized logic level. In fact, the pin can be floating at any undefined level. One solution to preventing floating nodes is to require the type detect pin to be always tied to a logic level. The system would be able to read in a logic high or logic low value, and program the power supply accordingly. However, additional circuitry and power would be needed in order to achieve this solution. This overhead adds extra costs to the overall price of a system. Another problem is when to sample the value on the pin. An inaccurate reading before the system is actually powered up could result in the damage of some circuits.

The present enhancement allows automatic evaluation of a supply voltage to determine a device's correct signaling level in the absence of an external pin. Board designers are often concerned about input conditions and how to implement power supply programming. Lower manufacturing and design costs may be achieved since a circuit comprising this invention does not have to be specially accommodated during power supply design. Furthermore, additional pins can be saved on a component. Some chip components and plug-in cards have programmable I/O interface characteristics. This invention removes the need for pins or registers to program such I/O interface characteristics. This invention may also ease the overstress effect on buffers. Automatic detection of signaling voltage levels without the use of a type detect pin offers system designers simplicity, low power, and lower cost.

One embodiment comprises of a voltage detector that senses the level of the I/O voltage supply at the end of system reset. The voltage detector circuit generates a logic signal indicating whether the supply voltage level is at a high or low level. The logic signal may be used to set operation variables such as buffer strength and voltage standoff controls in the component's I/O buffers. An advantage that may be realized in one embodiment is low power consumption. The voltage detector circuit of one embodiment consumes a minimal amount of power, especially after the reset becomes inactive. Furthermore, the voltage detector may be implemented in a manner that allows the detection of a signaling level higher than the native voltage of the system without electrical overstress (EOS).

For one embodiment, the power supply value is used as a programming mechanism. Furthermore, a system reset signal may be used to control when the supply voltage is sampled. The system reset signal toggles when the power supply reaches a reasonable level as the system powers up.

By definition, the power supply is considered stable when the reset signal goes away. In order to protect circuit components, the I/O buffers and other similar circuits are initially configured for a 3.3 volts signaling level from time zero of reset until the power supply reaches a stable level. Such a technique provides a safe condition for the devices. A 1.5 volts signal would not damage a 3.3 volts I/O buffer. On the other hand, a 3.3 volts signal could damage a 1.5 volts I/O buffer.

By applying a higher voltage signal initially, the circuit devices could start powering up without being damaged. When the reset signal toggles, the power supply voltage is sensed and latched. The value may be held until the next reset occurs. The sampling and latching operation of one embodiment occurs over a two clock evaluation period. The component takes the latched value and configures the buffers and buses to that signaling level. In another embodiment, the system may have a signal indicating that the power supply is stable. For example, a signal called POWER_GOOD may originate from the system power supply itself. The POWER_GOOD signal in some systems is the root signal that says operations can proceed to start up and configure circuits. The buffers may be configured for a safe voltage of 3.3 volts until the chip receives the POWER_GOOD signal and evaluates the actual signaling level.

The I/O buffers of one embodiment are capable of being configured dynamically. Internal compensation in the buffer allows the state of the buffer to be changed on the fly. Among the buffer characteristics that may be changed are input levels and reference levels. AGP also allows for the use of an internal input reference for high voltage and an external input reference for low voltage. However, the configuration of circuit devices to a particular signaling level may have to be tied to whatever power supply was sensed. This automatic detection scheme may also be used to configure a variety of circuits.

In another embodiment, separate I/O buffers may be present for the 1.5 volts and the 3.3 volts modes. A semiconductor manufacturing process may be designed for a particular voltage capability such as 1.5 volts for example. In order for new products to be remain backward compatible with older products, a chip manufactured on a 1.5 volts process may need to include special I/O buffers to support the older technology. Special internal detection and biasing may be required for the special buffers to operate and drive 3.3 volts signaling levels. Hence these special circuits are disabled when the chip is operating with 1.5 volts signaling levels. But when the chip is communicating with a 3.3 volts signaling level, the special support circuits are turned on.

Figure 3:
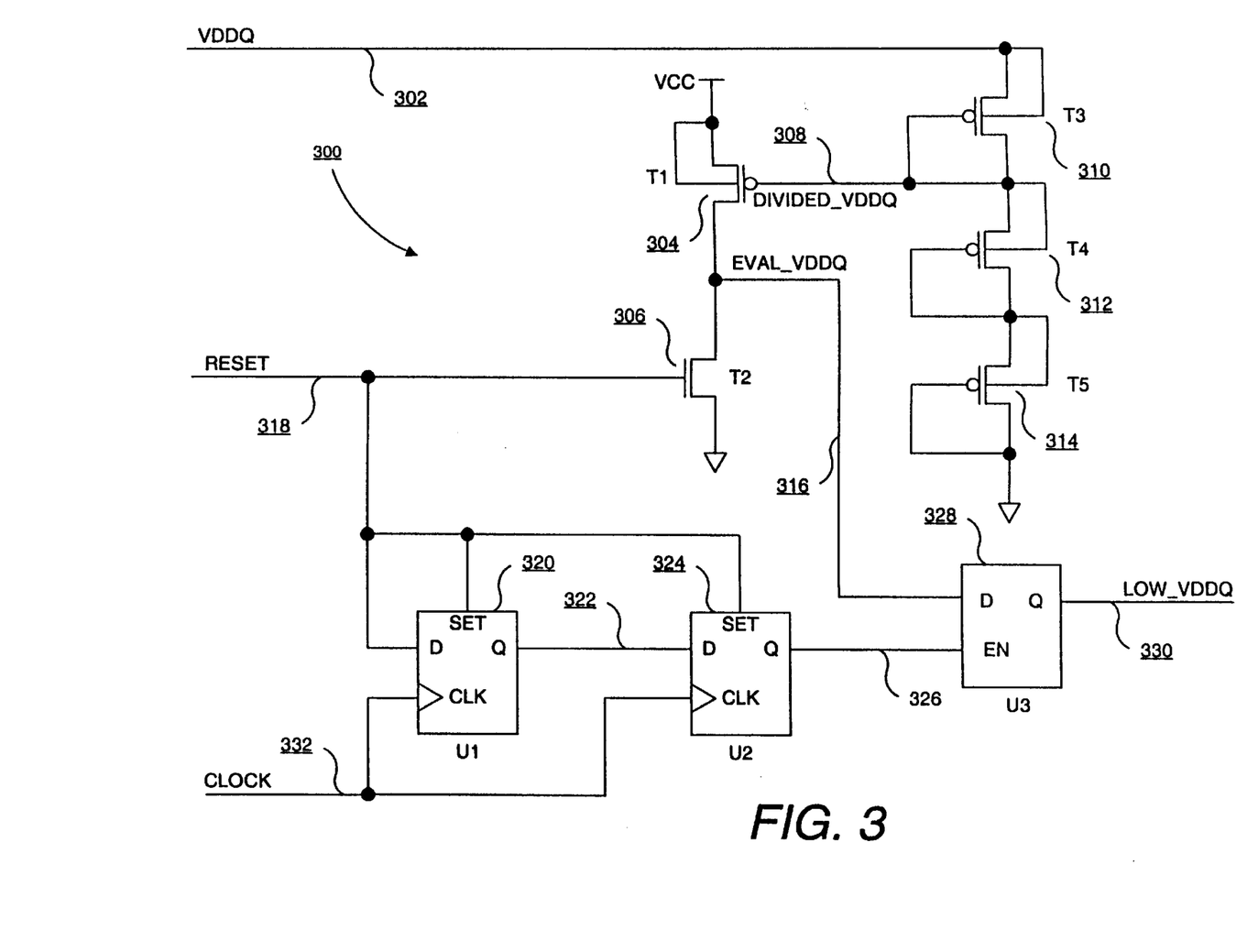
FIG. 3 is a schematic of one embodiment of a voltage detector circuit for automatically detecting signal levels for buffer configuration.

FIG. 3 is a schematic illustrating one embodiment of a voltage detector circuit 300 for automatically detecting signal levels for buffer configuration. The basic circuit of this embodiment comprises a voltage divider, control latches, and an output latch. The voltage divider is a means to get the comparison voltages (sensed and referenced levels) to line up. For the detection function, a divider is not required. This embodiment includes a voltage divider to get the voltages to the correct range for comparison and to avoid EOS issues. In the most general case, the divider may be a "null" circuit. Furthermore, the voltage divider or voltage reduction may have to be on the core voltage side, and not VDDQ, depending on the specific voltages of the implementation.

P type transistors T3 310, T4 312, and T5 314 form a voltage divider. The source terminal of T3 310 is coupled to VDDQ 302. VDDQ 302 is the signaling voltage that is being evaluated. The gate and drain terminals of T3 310 are tied together with the source terminal of T4 312. Similarly, the gate and drain terminals of T4 312 are connected to the drain terminal of T5 314. The gate and drain terminals of T5 314 are tied to a ground potential.

Transistors T3 310, T4 312, and T5 314 are sized such that very little current on the order of a few microamperes is drawn at any time. In some implementations, it may be desirable to design the chip in the micro power range so that a minimal amount of current is drawn during standby. The bulk of the current is consumed through the voltage divider in one embodiment of the voltage detector circuit 300. In other embodiments, more complex divider circuits may be implemented in an attempt to reduce current consumption. The transistors T3 310, T4 312, and T5 314 in the divider stack have relatively low voltages across any of its gate oxides such that EOS issues do not exist.

Building a divider network out of transistor devices provides a clean implementation. Transistors allow specific divider ratios and device sizes to be used. The transistors may be sized identically in one embodiment. In other embodiment, the sizes may be adjusted accordingly to arrive at the desired voltage divider ratio. Similarly, more transistors may be used in the voltage divider stack if sufficient die area is available or if numerous levels of VDDQ 302 are needed. The divider ratio of one embodiment is set based on the signaling ranges of the VDDQ supply 302 versus the range of VCC supply. In one embodiment of the invention for AGP, the divider ratio is set at 0.6*VDDQ.

A voltage divider network may also be constructed from resistive materials that would provide the proper ratios. In another embodiment of the present invention, the transistors in the voltage divider may be substituted with a resistor chain. Resistors in integrated circuits are generally constructed from polycrystalline silicon, also referred to as polysilicon or poly, or other layers such as N-well. N-well has reasonable resistances per square, but large areas are still required in order to get micro-Ampere currents. However, accurate resistors are difficult to fabricate in silicon since semiconductor materials that have accurate resistance values and are capable of being controlled are hard to obtain. Furthermore, the low resistance values per square of poly requires a significant amount of die space in order to construct a resistor on the order of the mega-Ohm range. The poly resistors also draw a large amount of current in standby mode.

When VDDQ 302 is at a high voltage level, the divided voltage at node 308 tied to the gate of T1 304 is also at a high level. When the potential at node 308 approaches a value of VCC minus the threshold level of P type transistor 304, T1 304 stops conducting current or is conducting at an extremely low level. Transistor T1 304 is essentially off. However, the divided VDDQ voltage at node 308 should be low enough so that the gate oxide of T1 304 is not overstressed. When the VDDQ signaling voltage is at a low voltage level, the divided voltage at node 308 is relatively low. As a result, T1 304 conducts current relatively strongly. In an alternative embodiment, T1 304 can be an N type transistor.

T1 304 is the evaluation device that compares the core voltage with a signaling voltage. One method of the present invention is for comparing the voltage divider output to the VCC–$V_{TP}$ level as a general "comparator" method. Transistor T1 304 performs as a voltage detector. T1 304 conducts when potential on node 308 is a $V_{TP}$ below VCC. In this embodiment, VCC acts as a reference voltage. Based on the divided VDDQ voltage at node 308, T1 304 may or may not conduct current. T1 304 may be designed with a non-minimum channel length to enhance the ratio of its conduction between the high and low signaling levels of VDDQ 302. In an alternative embodiment, T1 304 can be replaced with a comparator.

In another embodiment where the core voltage and VDDQ are aligned, a voltage divider is not needed. The voltage divider is a means to get the sensed and referenced levels to align. VDDQ may be compared directly to VCC. Hence, the transistor tree of T3 310, T4 312, and T5 314 can be left out in that embodiment.

The source of P type transistor T1 304 is coupled to a VCC voltage supply. The gate terminal of T1 304 is connected to the gate and drain terminals of T3 310 at node 308. The drain terminal of T1 304 is connected to the drain terminal of N type transistor T2 306. The value at the drain terminal of T1 304 is sent to output latch U3 328. U3 328 is a level triggered latch. The data input of latch U3 328 is also connected to the drain terminals of T1 304 and T2 306 at node 316. The gate terminal of T2 306 is tied to a reset signal "RESET" 318. RESET 318 may also be a system reset signal or a power good signal. The source terminal of T2 306 is tied to a ground potential.

The reset signal 318 is also coupled to the data input of flip-flop U1 320. A clock signal "CLOCK" 332 is coupled to the clock inputs of flip-flops U1 320 and U2 324. The data output 322 of U1 320 is connected to the data input D of U2 324. In turn, the data output 326 of U2 324 is connected to the latch enable of latch U3 328. Flip-flops U1 320 and U2 324 in this embodiment are rising edge triggered. The RESET signal 318 is also coupled to the "set" inputs on both U1 320 and U2 324 so that the flip-flops are reset during the initial propagation of the delayed reset to latch U3 328.

The detector circuit operates by RESET 318 turning off T2 306 and releasing control of node 316. The detection and evaluation of the VDDQ signaling level 302 occurs two clock cycles after the reset signal 318 toggles. RESET 318 controls when T1 304 detects the voltage level of VDDQ 302. If RESET 318 is a logic high, transistor T2 306 is conducting and the drain terminal of T1 304 is pulled low. In this embodiment, output latch U3 328 is transparent while RESET 318 is a logic high and for two clock cycles after RESET transitions to a logic low. Whatever value is on node 316 is passed to the output of U3 328 until the latch is disabled. The two flip-flops U1 320 and U2 324 delay the propagation of RESET signal 318 from the input of the detector circuit 300 to the latch enable of U3 328. As a result, the closing of latch U3 328 is delayed for two clock cycles. Other delay mechanisms may be utilized in other embodiments.

The low logic level on the drain terminal of T1 304 is a default state. The logic low propagates to the LOW_VDDQ signal 330 at the detector output. Since LOW_VDDQ 330 is at a low logic level, the detector indicates that VDDQ 302 is not low. Hence the chip configures the buffers for a high signaling level as a default condition. This is a safety feature of one embodiment to ensure that the interface I/O buffers will not be exposed to possible EOS conditions if a high voltage external signal is applied to an input buffer configured for a low signaling voltage.

After RESET signal 318 transitions to a logic low, the level at the drain terminal of T1 304 is sampled after two clock cycles by latch 328 and held. T1 304 will conduct current strongly and pull its drain terminal high if VDDQ 302 is at a low signaling level. T1 304 has to pull node 316 above the threshold level of U3 328 in order for the latch output to switch to a logic high. Output latch U3 328 will transition its output signal LOW_VDDQ 330 to a logic high state. As a result, the I/O buffers may be configured for low signaling level (1.5 volts) operation. On the other hand, the drain terminal of T1 304 will remain low if VDDQ 302 is at a high signaling level since T1 304 will be off or conducting insufficient current to pull its drain up. If T1 304 cannot pull its drain terminal above the switching point of the output latch U3 328, the output signal LOW_VDDQ 330 is a logic low value. The I/O buffers will remain configured for high signaling level (3.3 volts) operation.

Figure 4:
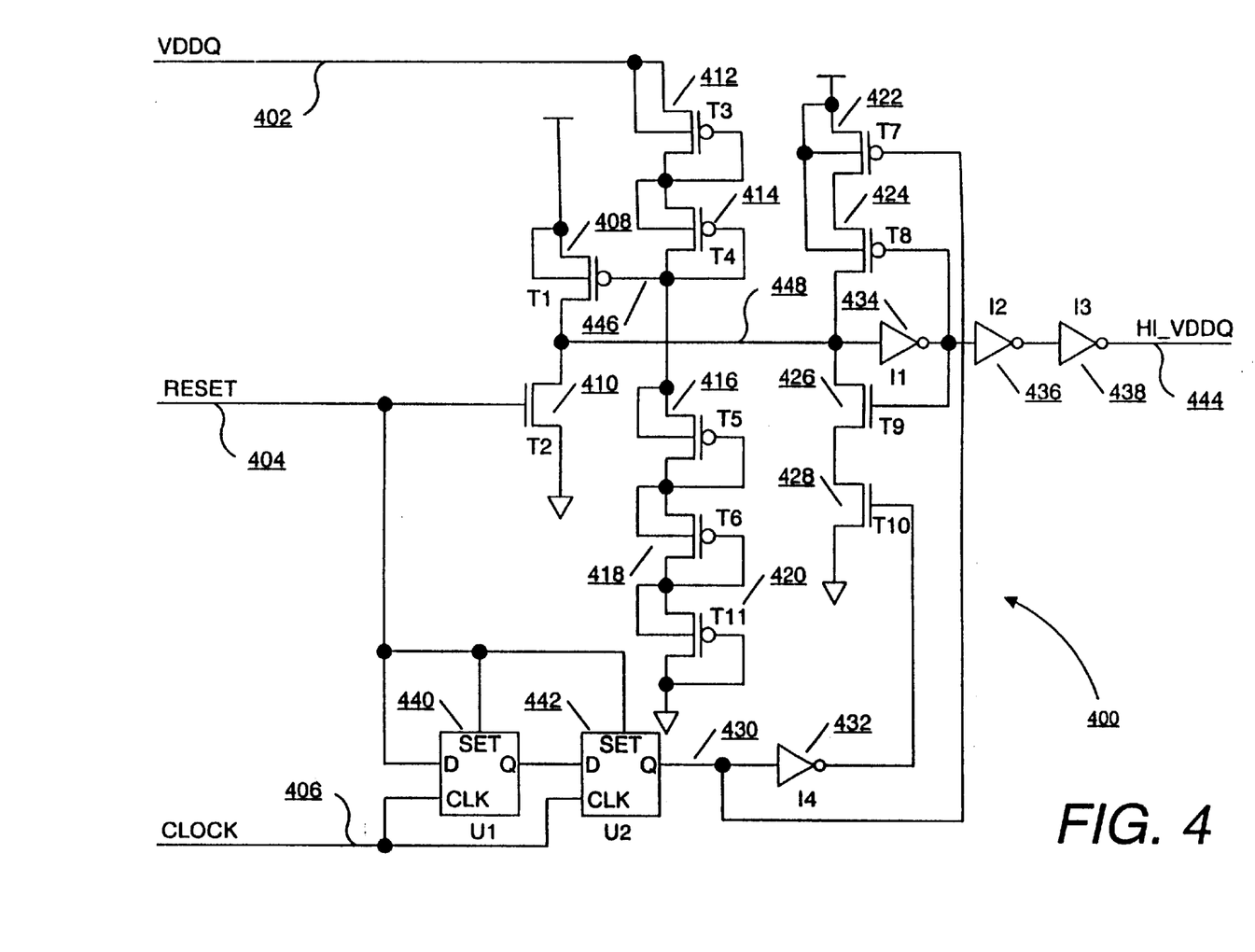
FIG. 4 is a schematic of a voltage detector circuit in another embodiment.

FIG. 4 is a schematic illustrating a voltage detector circuit 400 in another embodiment of the present invention. In this embodiment, P type transistors T3 412, T4 414, T5 416, T6 418, and T11 420 are coupled together to form a voltage divider. T3 412 heads up the transistor chain. The source terminal of T3 412 is connected to VDDQ 402. The other end of the transistor chain is completed by T11 420. The gate and drain terminals of T11 420 is connected to a ground potential. The voltage divider is a means to get the sensed and referenced levels to align. In an alternative embodiment, the voltage divider is not necessary. VDDQ 402 can be directly connected to the gate terminal of T1 408. T1 408 senses the divided VDDQ voltage and evaluates the value relative to VCC. In this embodiment, VCC serves as a reference voltage. The source terminal of T1 408 is connected to a VCC supply. The gate terminal of T1 408 is connected to the gate and drain terminals of T4 414 and the source terminal of T5 416 at node 446. Node 446 has the divided VDDQ potential that is to be evaluated. A filter capacitor may be added to node 446 to reduce noise. The drain terminal of T1 408 is connected to the drain terminal of T2 410 at node 448. The N type transistor T2 410 has its gate terminal tied to a reset signal (RESET) 404 and its source terminal at a ground potential. The value on node 448 indicates whether VDDQ 402 is high or low relative to VCC.

The reset signal 404 may include, but is not limited to, a system reset signal or a power good signal. RESET 404 is also coupled to the data input of flip-flop U1 440. A clock signal (CLOCK) 406 is connected to the clock input of flip-flops U1 440 and U2 442. The data output of U1 440 is connected to the data input of U2 442. U1 440 and U2 442 are arranged such that an input, RESET 404, at the first flip-flop, U1 440, would take two clock cycles to propagate to the output of the second flip-flop, U2 442. The data output 430 of U2 442 drives the input terminal of inverter I4 432 and the gate terminal of T7 422. The RESET signal 404 is also coupled to the "set" inputs on both U1 440 and U2 442 so that the flip-flops are reset during the initial propagation of the delayed reset to inverter I4 432.

The source terminal of T7 422 is connected to a VCC supply. The drain terminal of T7 422 is connected to the source terminal of T8 424. At node 448, the drain terminal of T8 424, the input terminal of inverter I1 434, the drain terminal of T9 426, the drain terminal of T1 408, and the drain terminal of T2 410 are all coupled together. The source terminal of T9 426 is connected to the drain terminal of T10 428 and the gate terminal of T10 428 is connected to the output terminal of inverter I4 432. The gate terminals of T8 424 and T9 426 are connected to the output terminal of inverter I1 434. I1 434 also drives the input terminal of inverter I2 436, whose output in turn drives the input of I3 438. The output of I3 438 is the output signal (HI_VDDQ) 444 of the voltage detector circuit 400. When HI_VDDQ 444 is at a logic high state, then VDDQ 402 is at a high signaling level. A logic low state on HI_VDDQ 444 indicates that VDDQ 402 is at a low signaling level.

The output latch function of the voltage divider circuit in this embodiment is performed by the combination of T7 422, T8 424, T9 426, T10 428, I1 434, I2 436, I3 438, and I4 432. The delayed version of RESET 404 at node 430 and its inverted companion control when the result of the VDDQ and VCC comparison at node 448 is sampled and latched away. During a reset sequence, the reset signal RESET 404 remains at a logic high. RESET 404 transitions to a logic low value when reset is complete. After two clock cycles, the change in RESET 404 has propagated to the output of U2 442 at node 430. When the output 430 of U2 442 is a logic high, T7 422 and T10 428 are off. But when output 430 is a logic low, T7 422 and T10 428 are on and current is conducted. Depending on whether the potential at the input terminal of I1 434 on node 448 is above or below the switching level of I1 434, either T8 424 or T9 426 turns on. If node 448 is high, then I1 434 drives a low output value and turns on T8 424. The current through T8 424 will keep node 448 high. If node 448 is low, then I1 434 drives a high output value and turns on T9 426. The current though T9 426 will pull node 448 down and keep node 448 low. Inverters I2 436 and I3 438 help to drive the output HI_VDDQ 444 of the voltage detector circuit 400. The output signal HI_VDDQ 444 in this embodiment indicates that VDDQ 402 is at a high signaling level. I3 438 may be removed or an addition inverter added to invert the output signal or to change the signal to indicate a low VDDQ signaling level.

In this embodiment, the reset signal RESET 404 has an asynchronous assert and a synchronous de-assert characteristic. In other words, as soon as the chip recognizes that a reset signal is asserted on the input pin, the reset signal 404 is propagated to the voltage detector circuit 400 immediately. RESET 404 is basically a buffered version of the raw system reset signal. The reset signal 404 in the voltage detector circuit 400 is gated through a clocked flip-flop path. When the clock gets asserted, the RESET 404 transitions on the appropriate clock edge.

Control signals other than reset may be used in other embodiments. Alternative embodiments can use other ways of implementing the latch mechanism. Furthermore, the number of transistors, device sizes, or types of circuit elements forming the voltage divider may vary depending on the particular implementation.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method of configuring buffers comprising:
    initializing an input/output (I/O) buffer to a default signaling level, said input/output buffer configurable to operate at a first signaling level and a second signaling level, said default signaling level having a voltage level higher than said second signaling level;
    sampling a first signal from an external circuit after receiving notification that said first signal has reached a predetermined level, said first signal to indicate a signaling level of said external circuit;
    comparing said first signal with a second signal to determine whether said first signal has a higher voltage potential than said second signal;
    latching a result of said comparison, wherein said result indicates whether said external circuit operates at said first signaling level or said second signaling level; and
    using said result to program buffer characteristics for said input/output buffer, wherein said I/O buffer is programmable to operate with said signaling level of said external circuit.

2. The method of claim 1 wherein said first signal is passed through a voltage divider before being compared with said second signal.

3. The method of claim 1 wherein an enable signal controls when said comparing occurs.

4. The method of claim 1 wherein said latching happens at least one clock cycle after an enable signal transitions.

5. The method of claim 1 further comprising enabling a latch to store and output said result.

6. The method of claim 1 wherein said sampling happens during a power-up sequence.

7. The method of claim 1 wherein said result defaults to a safe mode when said enable signal is not active.

8. An apparatus for automatically detecting a signaling level comprising:
    an input for a first signal, said first signal to have a voltage potential to be evaluated, said first signal having information about an external signaling level;
    an input for a second signal, said second signal to have a reference voltage;
    an evaluation device coupled to said first input and said second input, said evaluation device to determine whether said first signal has a higher voltage potential than said reference voltage and to generate a result, said determination to occur upon receipt of an indication that said first signal has achieved an acceptable level;
    a latch coupled to said evaluation device, said latch to store said result from said evaluation device, said result to indicate whether said external signaling level is at a first signaling voltage or a second signaling voltage, wherein said first signaling voltage is higher than said second signaling voltage; and
    an output coupled to said latch, said output to drive a signal indicating said result to a buffer, said buffer configurable to operate at said external signaling level, said signal further to configure said buffer to a default signaling voltage equal to said first signaling voltage prior to latching of said result from said determination.

9. The apparatus of claim 8 wherein said evaluation device is a P type transistor.

10. The apparatus of claim 8 wherein said evaluation device is an N type transistor.

11. The apparatus of claim 8 wherein said evaluation device is a comparator.

12. The apparatus of claim 8 further comprising a control signal coupled to a reset device, said reset device grounding said evaluation device and said result indicates a default condition.

13. The apparatus of claim 12 wherein said default condition is where said first signal has a voltage potential greater than said reference voltage.

14. The apparatus of claim 8 further comprising a control signal coupled to a input of a flip-flop, said flip-flop having an output coupled to an enable of said latch, said flip-flop clocked to delay propagation of said control signal for one clock cycle.

15. A method of automatically detecting a signaling level comprising:
    receiving a first signal into a circuit for evaluation, wherein said first signal is encoded to indicate an external input/output (I/O) signaling level;
    generating a second signal from said first signal by passing said first signal through a voltage divider to reduce said first signal to a lower voltage potential;

evaluating said second signal relative to a third signal to determine whether said second signal has a higher voltage potential than said third signal and generating a result, said evaluation to occur upon receipt of an indication that said first signal is valid;

latching said result of said evaluation in response to a clock signal and receipt of said indication, said result to indicate whether said external input/output signaling level is at a first signaling voltage or a second signaling voltage, wherein said first signaling voltage is greater than said second signaling voltage;

outputting said result from said circuit; and configuring an I/O buffer to operate with said external I/O signal level based said on result, said I/O buffer initialized to operate at a default signaling level prior to said latching of said result from said evaluation, said default signaling level having a voltage level of at least said first signaling voltage.

16. The method of claim 15 further comprising configuring a buffer for a signaling level based on said result.

17. The method of claim 15 wherein said evaluating occurs during system power-up.

18. The method of claim 15 further comprising controlling operation of said circuit with an enable signal.

19. The method of claim 18 wherein said enable signal is a reset signal.

20. The method of claim 18 wherein said enable signal is a power good signal.

21. The method of claim 18 wherein said enable signal controls said result of said evaluation and sets a default state when said circuit is disabled.

22. The method of claim 18 wherein said enable signal controls when said latching of said result occurs.

23. The method of claim 22 wherein said enable signal is delayed for at least one clock cycle before enabling said latching of said result.

24. The method of claim 18 wherein said result defaults to a safe mode when said enable signal is not active.

25. The method of claim 24 wherein said safe mode indicates that said second signal has a greater voltage potential than said third signal.

26. An apparatus for automatically detecting a signaling level comprising:

an input for a first signal, said first signal to have a voltage potential to be evaluated, said voltage potential to indicate an external input/output (I/O) signaling level;

a voltage divider coupled to said input and to receive said first signal, said voltage divider to generate a second signal having a lower voltage potential than said first signal;

an evaluation device coupled to said voltage divider, said evaluation device to determine whether said second signal has a higher voltage potential than a reference voltage and to generate a result, said determination to occur after receipt of an indication that said first signal is at least a requisite level;

a latch coupled to said evaluation device, said latch to store said result from said evaluation device, said result to indicate whether said external signaling level is at a first signaling level or a second signaling level, wherein said first signaling level is higher than said second signaling level; and an output coupled to said latch, said output to drive a signal indicating said result to a buffer configurable to operate with said external I/O signaling level, said signal to initially configure said buffer to a default signaling level prior to latching of said result from said determination, and said signal further to configure said buffer to said external I/O signaling level after said latching.

27. The apparatus of claim 26 wherein said evaluation device is a P type transistor.

28. The apparatus of claim 26 wherein said evaluation device is an N type transistor.

29. The apparatus of claim 26 wherein said evaluation device is a comparator.

30. The apparatus of claim 26 further comprising a control signal coupled to a reset device, said reset device grounding said evaluation device and said result indicates a default condition.

31. The apparatus of claim 30 wherein said default condition is where said second signal has a voltage potential greater than said reference voltage.

32. The apparatus of claim 26 further comprising a control signal coupled to a input of a flip-flop, said flip-flop having an output coupled to an enable of said latch, said flip-flop clocked to delay propagation of said control signal for one clock cycle.

33. A memory controller hub comprising:

a bus master and a bus bridge;

a memory control logic coupled to said bus master;

a system control logic coupled to said memory control logic;

an Accelerated Graphics Port (AGP) interconnect coupled to said memory control logic; and a voltage detector circuit coupled to said Accelerated Graphics Port interconnect, said voltage detector circuit comprising an input to receive a first signal from said AGP interconnect, said first signal to have a voltage potential to be evaluated, said voltage potential to indicate an input/output (I/O) signaling level of said AGP interconnect;

an evaluation device coupled to said input, said evaluation device to determine whether said first signal has a higher voltage potential than a reference voltage and to generate a result, said determination to occur after receipt of an indication that said first signal is at least a requisite level;

a latch coupled to said evaluation device, said latch to store said result from said evaluation device, said result to indicate whether said I/O signaling level of said AGP interconnect is at a first signaling level or a second signaling level, wherein said first signaling level is higher than said second signaling level; and an output coupled to said latch, said output to drive a signal indicating said result, said output for configuring characteristics of buffers to operate with said I/O signaling level on said AGP interconnect, said signal to initially configure said buffers to a default signaling level prior to latching of said result from said determination, and said signal further to configure said buffers at said I/O signaling level of said AGP interconnect after said latching.

34. The memory controller hub of claim 33 wherein said evaluation device is a P type transistor.

35. The memory controller hub of claim 33 wherein said evaluation device is a N type transistor.

36. The memory controller hub of claim 33 wherein said evaluation device is a comparator.

37. The memory controller hub of claim 33 further comprising a control signal coupled to a reset device, said reset device grounding said evaluation device and said result indicates a default condition.

38. The memory controller hub of claim 37 wherein said result defaults to a safe mode when said control signal is not active.

39. The memory controller hub of claim 33 wherein said default condition is where said first signal has a voltage potential greater than said reference voltage.

40. A digital processing system comprising:

a processor;

a main memory coupled to said processor;

a memory controller hub coupled to said processor, said memory controller hub having an Accelerated Graphics Port without a type detection pin, said memory controller hub having a voltage detector for detecting a signaling level of a device coupled to said Accelerated Graphics Port and internal logic for programming buffer characteristics, said memory controller hub comprising:

an evaluation device to determine whether said first signal from said Accelerate Graphics Port has a higher voltage potential than a reference voltage and to generate a result for said determination after receipt of an indication that said first signal is at least a requisite level; said result to indicate whether said signaling level of said device is at a first signaling voltage or a second signaling voltage, wherein said first signaling voltage is higher than said second signaling voltage; and an output to drive a control signal for configuring characteristics of input/output buffers to operate with said signaling level of said device, said signal to initially configure said buffers to a default signaling level prior to generation of said result, and said signal further to configure said buffers at said signaling level of said device after said determination; and a video card coupled to said Accelerated Graphics Port.

41. The digital processing system of claim 40 wherein said detecting and programming occurs during a system reset.

* * * * *